United States Patent [19]
Fischer

[11] 3,955,464
[45] *May 11, 1976

[54] EXPANSIBLE ANCHOR FOR SECURING AN OBJECT TO A SUPPORT STRUCTURE

[76] Inventor: Artur Fischer, Altheimer Strasse 219, D-7241 Tumlingen, Germany

[ * ] Notice: The portion of the term of this patent subsequent to Sept. 24, 1991, has been disclaimed.

[22] Filed: Apr. 11, 1974

[21] Appl. No.: 460,067

[30] Foreign Application Priority Data
May 25, 1973 Germany............................ 2326713

[52] U.S. Cl......................................... 85/64; 85/74
[51] Int. Cl.².......................................... F16B 13/06
[58] Field of Search.............. 85/73, 74, 75, 76, 77, 85/78, 79, 64

[56] References Cited
UNITED STATES PATENTS

| | | | |
|---|---|---|---|
| 681,817 | 9/1901 | Smith | 85/75 |
| 768,283 | 8/1904 | Jenkins | 85/64 |
| 1,628,253 | 5/1927 | Lyddane | 85/67 |
| 1,964,427 | 6/1934 | Chandler | 85/79 |
| 3,277,770 | 10/1966 | McCulloch | 85/79 |
| 3,379,089 | 4/1968 | Williams | 85/73 |
| 3,837,257 | 9/1974 | Fischer | 85/64 |

FOREIGN PATENTS OR APPLICATIONS
1,179,556  12/1958  France..................................... 85/73

*Primary Examiner*—Roy D. Frazier
*Assistant Examiner*—Thomas J. Holko
*Attorney, Agent, or Firm*—Michael J. Striker

[57] ABSTRACT

An expansion anchor sleeve has a leading end and a trailing end and can be inserted into an anchoring hole of a support structure. An expander member is located at the leading end and can be drawn into the same by a screw extending through the sleeve and engaging the expander member. A portion of the screw extends from the trailing end of the sleeve and out of the anchoring hole, being adapted to extend through an object that is to be secured to a support structure. A nut is threaded onto this portion and arranged to engage the screw after it has been threaded onto the same to some extent, so as to turn the screw and cause it to pull the expander member into the leading end of the sleeve, thereby expanding the same, until the nut finally contacts the object to be supported and holds the same in place.

6 Claims, 1 Drawing Figure

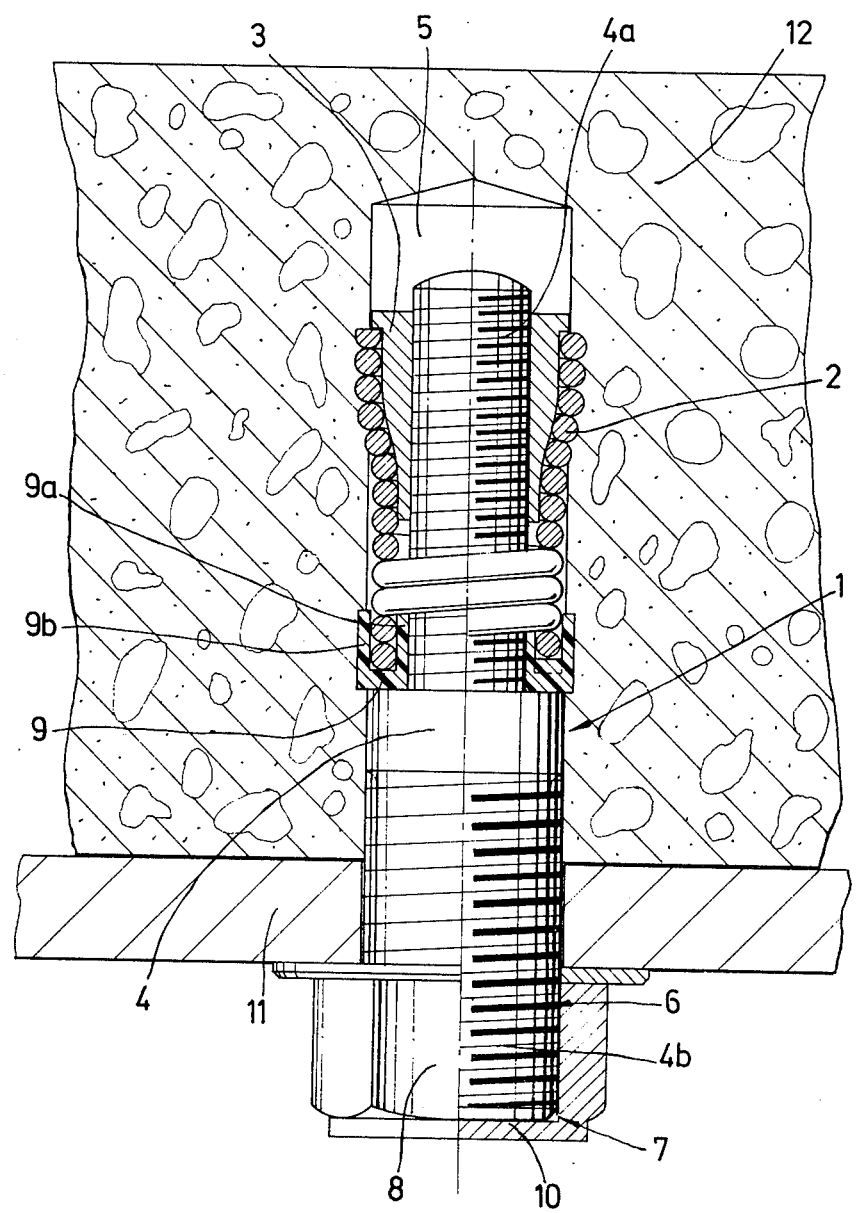

EXPANSIBLE ANCHOR FOR SECURING AN OBJECT TO A SUPPORT STRUCTURE

BACKGROUND OF THE INVENTION

The present invention relates generally to an expansible anchor, and more particularly to an expansible anchor for securing an object to a support structure.

Expansible anchors of many different types are already known. The present invention is particularly concerned with the type in which an expansion anchor sleeve and an expander member are inserted into an expansion anchor hole formed in a support structure, and the screw which does not have a head and which extends through the sleeve and engages the expander member, has a portion extending out of the sleeve and through an opening in an object that is to be mounted on a support structure. One type of prior-art arrangement utilizes a nut that is threaded on that portion of the screw that extends outwardly beyond the object until the nut engages the outer surface of the object, bearing upon the same and pulling the screw in outward direction, so as to thereby expand the expansion anchor sleeve. Depending upon the hardness of the support structure in which the sleeve is being expanded, a relatively significant length of the screw may be pulled outwardly before the sleeve has been extended to the point where it is firmly anchored. This means that quite a substantial portion of the screw projects outwardly beyond the object being anchored, and also beyond the nut which holds the object in place on the screw. This is of course not only aesthetically unattractive, but also these projecting portions of the screws represent a significant potential source of accidents. In addition, the threads on these portions are exposed to ambient conditions, and may either be damaged by impact or may corrode, which makes it at least difficult and in some instances impossible to remove the screw so that the element which is being supported on the support structure, can be removed or replaced.

The prior art has proposed to overcome these disadvantages by using screws having heads, instead of employing nuts. In this case, the head itself eventually contacts the object being supported, as the screw is threaded into the sleeve, and when the head contacts the object, further turning of the screw will of course cause the expander member to be drawn into the expansion sleeve whereas no axial displacement of the screw can occur.

This solution overcomes the disadvantages of the type of construction described first, but it also eliminates a significant advantage offered by that type of construction. It is evident that in the first-mentioned construction, the respective expansion sleeve with the screw already threaded into the expander member and projecting out of the sleeve can be inserted into the respective expansion anchor hole and that the object to be mounted on the support structure can have holes predrilled or otherwise performed, which need merely be aligned with the respective screws so that the latter can be extended through them, whereupon the object is supported on the screws and need not be held in place while the nuts are threaded onto the respective outer ends of the respective screws. This is a significant advantage in terms of mounting the object, an advantage which is not offered by the second type of prior-art devices.

Heretofore, the art has not proposed any device of the type in question which eliminates the disadvantages of both prior-art approaches which have been outlined herebefore, and at the same time combines their advantages.

SUMMARY OF THE INVENTION

Accordingly, it is an object of the present invention to provide an expansible anchor which achieves precisely these purposes.

More particularly, it is an object of the present invention to provide a novel expansible anchor for securing an object to a support structure which anchor is not possessed of the disadvantages of the prior art, but which does possess its advantages.

In keeping with the above objects and with others which will become apparent hereafter, one feature of the invention resides in an expansible anchor for securing an object to a support structure. According to the invention the anchor comprises an expansion sleeve having a leading end and a trailing end and being adapted for insertion in an anchoring hole of a support structure. An expander member is located at the leading end, and an expander screw in form of a threaded rod-like member extends through the sleeve and engages the expander member for drawing the same into the sleeve to thereby expand the latter. The screw has a rear portion which extends outwardly from the trailing end of the sleeve and is adapted to extend through an object to be secured to the support structure. Nut means is threaded onto the rear portion of the screw, and arranged to engage the latter and to cause the same to turn in response to turning of the nut means so that turning of the screw and nut means subsequent to abutment of the latter against the object results in drawing of the expander member into the sleeve and concomitant expansion of the latter.

The desired engagement of the nut means with the screw, in a sense causing the screw to turn once such engagement has taken place, can be achieved in different ways. One of these is to make the length of the thread on the rear portion of the screw slightly shorter than the length of the thread in the nut means.

Using the device according to the present invention, an expansion anchor hole is first formed in the support structure, having a diameter corresponding to the outer diameter of the expansion anchor sleeve. After the latter is inserted into the hole together with the expander member, so that the end of the screw extends outwardly beyond the hole, the object to be supported in which a corresponding hole is previously formed, is put in place so that the screw also extends outwardly through this hole in the object. Of course, a threaded portion of the screw must extend outwardly beyond the object, and the nut means is now threaded onto this threaded portion until it engages the latter in a sense preventing relative displacement of the nut means with reference to the screw, so that the further turning of the nut means will now also result in turning of the screw. The screw can now either be turned together with the nut means, or it is also possible to exert pressure or blows upon the nut means to drive the screw further into the hole, together with the sleeve which is yet not expanded in the hole, until the nut means engages the outer surface of the support structure. When the nut means is now turned further, which results in concomitant turning of the screw, the latter does not become axially displaced but instead draws the expander member into the expansion anchor sleeve, thereby expanding the latter until it is firmly anchored in the expansion anchor hole. The nut means of course presses the object against the surface of the support structure and thus holds it in place. Thus, the construction according to the present invention makes it possible to use all the advantages of the first-mentioned type of prior art device, in terms of the ease of installation, but concommittantly avoids the disadvantges of that type of construction and utilizes the advantages of the second-mentioned type of prior-art device. Particularly if the object to be mounted on the support structure is bulky and/or heavy the possibility of simply pushing it onto one or more outwardly extending screw end portions without having to further hold it once this is done, is highly advantageous in terms of the speed and ease of installation. Moreover, once the installation is completed only the nut means will be exposed at the exterior surface of the object, and there will be no portions of the screws extending outwardly beyond the nut means to become damaged or corroded, or to constitute potential hazards.

The nut means can use a closed cap nut, that is a nut which has a blind bore that is tapped. In this case it will be the engagement of the outer end of the rear portion of the screw with the bottom of the blind bore that will determine at which point the screw begins to turn together with the nut. If the cap nut is appropriately configured, it can be used to provide a seal with the surface of the object being supported, so as to prevent the access of moisture or the like to the threads of the screw. Also, the cap nut can of course be configurated to resemble the head of the screw if this should be desired for any reason.

That portion of the screw which extends through the sleeve can have a smaller diameter than the portion which extends outwardly beyond the rear end of the same and whose outer diameter may for instance equal the outer diameter of the sleeve in the unexpanded condition of the latter. This provides a particularly good support of the arrangement in the expansion anchor hole since whatever part of the rear portion of the screw is located in the expansion anchor hole, intermediate the outer open end of the latter and the trailing end of the expansion anchor sleeve, will contribute to the support of the arrangement in the hole. Moreover, the increased diameter of this portion of the screw makes it possible for the latter to withstand rather high bending and shear forces. This, in turn, makes it possible to use the device according to the present invention for mounting heavy and very heavy objects on a support structure, or, conversely, it permits the use of fewer of the expansion anchor arrangements per object to be mounted than was previously possible. Evidently, this reduces the cost in terms of material and also in terms of the installation time required, and thus of the labor expenses involved. The sleeve itself can advantageously although not necessarily be in form of a block spring wound of wire, and the expander member may be provided with a transversely extending flange which engages the foremost convolution of the leading end of the sleeve, when the expander member has been drawn into the sleeve sufficiently to already expand the same. This has the advantage that the expander member cannot be pulled through the sleeve, and that the expansion effect becomes actually intensified when extraction forces act upon the screw tending to pull the expander member through the sleeve. The configuration of the sleeve in form of a block spring, on the other hand, offers the advantage that due to its inherent elasticity it can accommodate itself readily to the contour of the expansion anchor hole and provide for tight frictional engagement in the latter even before expansion begins. This prevents undesired turning of the sleeve during the expanding operation, which would interfere with proper expansion. On the other hand, the spreading apart of the block spring produces only radial spreading forces which significantly reduces or even eliminates the danger that the forces acting upon the surrounding material bounding bore hole might cause this material to break away. This advantage is obtained even if the bore hole is relatively short or if relatively high loads act upon the device.

A cap of synthetic plastic material may be placed upon the trailing end of the expansion anchor sleeve, having an inner tubular portion or collar which extends into the interior of the sleeve, an outer collar which surrounds the exterior of the sleeve in the region of the trailing end of the latter, and an annular portion connecting the two collars and overlying the rear end of the sleeve. The provision of the outer collar slightly increases the outer diameter of the sleeve and thus causes the latter to be even more firmly retained in the expansion anchor hole prior to expansion, so as to prevent it from turning during the expansion. Moreover, it can also seal the sleeve against the ambient atmosphere, thus preventing the possibility that corrosive matter might enter the sleeve and possibly damage it or that the portion of the screw located in it.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a fragmentary partly sectioned view, illustrating an embodiment of the invention.

DESCRIPTION OF THE PREFERRED EMBODIMENTS

The drawing shows by way of example an embodiment of the invention on hand of which the latter can be explained readily. Reference numeral 1 identifies the expansion anchor device in toto, and it will be seen that it utilizes an expansion anchor sleeve 2 which is here in form of a wire block spring which is inserted into an expansion anchor hole 5 formed in a support structure 12, for instance a wall, ceiling or the like of concrete or any other suitable material. An object 11, for instance a cladding panel, is to be mounted on the support structure 12.

At the leading end of the sleeve 2, that is the end which is first inserted into the expansion anchor hole 5, there is located an expander member 3. A rod-shaped threaded expansion member 4, called a "screw" for short, is threaded into the expander member 3, extending through the sleeve 2. The portion 4a is the one that is located in the sleeve 2 and which engages the expander member 3, whereas the portion 4b which extends outwardly beyond the trailing end of the sleeve 2 and out of the expansion anchor hole 5, has a larger outer diameter corresponding to the outer diameter of the sleeve 2 in the non-expanded condition of the latter.

The portion 4b extends in part through the object 11 and in part it extends beyond this object, outwardly thereof. The latter part is formed with a section of thread 6 onto which a cap nut 8 having an internal thread 7 can be screwed. When this is done, the outer end of the portion 4b abuts the bottom of the blind bore in the cap nut 8, and from there on the cap nut 8 and the screw 4 will be turned jointly until the cap nut 8 engages the outer surface of the object 4 and the expander member 3 will now be drawn into the sleeve 2 until in fact the latter is expanded in the manner shown in the drawing.

In the illustrated embodiment I have shown the possibility of using a cap 9 of synthetic plastic material, for instance nylon, polyvinylchloride or the like, via which the sleeve 2 bears upon the shoulder formed between the portions 4a and 4b of the screw 4. The cap 9 is provided with two tubular collars 9a and 9b of which the former extends into the sleeve 2 and the outer surrounds the sleeve 2. An annular portion connects the two collars 9a and 9b and overlies the outer end face of the sleeve. The slight increase of the diameter of the sleeve where the outer collar 9b is present, provides increased friction for the sleeve with the inner surface bounding the bore 5 and prevents the sleeve from turning before the expansion has reached the point where turning of the sleeve becomes impossible. Moreover, the cap 9 can seal the sleeve with respect to the ambient atmosphere.

As mentioned before, the outer end face of the portion 4b can abut the bottom wall 10 bounding the blind bore in the cap nut 8. However, it is also possible to make the length of the threaded section 6 somewhat shorter than the length of the thread in the cap nut 8. The first-mentioned possibility has the advantage that the remaining part of the threaded section can be used for other purposes, for instance, to regulate the spacing of the object 11 from the support structure 12, or to permit a washer to be interposed between the object 11 and the cap nut 8. The cap nut 8, incidentally, is advantageously provided with appropriate facets which facilitate its engagement with a tool for turning it, for instance a box wrench or the like. When the connection is to be released, for instance to be able to remove and replace the object 11 or to be able to inspect the portion of the support structure 12 which is located beneath and concealed by the object 11, the cap nut 8 is simply turned in opposite direction until it is loosened, and the object 11 can then be removed. To assure that the cap nut 8 can be readily removed from the screw 4 without any danger that the expansion anchor itself might become loosened, it is advantageous to insert into the interior of the cap nut between the bottom 10 thereof and the screw 4 a synthetic plastic disc or the like, for instance of a synthetic plastic material having a high slippage factor, that is a low coefficient of friction, so that the release of the cap nut if and when desired is assured without causing turning of the screw 4.

It will be understood that each of the elements described above, or two or more together, may also find a useful application in other types of constructions differing from the types described above.

While the invention has been illustrated and described as embodied in an expansible anchor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An expansible anchor for securing an object to a support structure comprising an expansion sleeve having a leading end portion and a trailing end portion and adapted for insertion in an anchoring hole of a support structure; an expander member at said leading end portion; an expander screw in form of a threaded rod-like member extending through said sleeve and having a front portion engaging said expander member for drawing the same into said sleeve to thereby expand the latter, a rear portion which extends outwardly from said trailing end portion and is adapted to extend through an object to be secured to the support structure, and an abutment portion forming an annular shoulder extending radially outwardly of said front portion and having an outer diameter equal to the outer diameter of said sleeve; a nut threaded onto said rear portion of said screw and arranged to engage said rear portion of said screw and cause the latter to turn in response to turning of said nut which results in drawing of said expander member into said sleeve; and a cap having concentric inner and outer annular wall portions and a transverse wall portion connecting said annular wall portions, said wall portions having respective first surfaces bounding a space for receiving said trailing end portion of said sleeve, and second surfaces opposite said first surfaces, the second surface of said outer annular portion having a diameter exceeding that of the anchoring hole of the support structure prior to cap insertion whereby said cap is frictionally retained in the anchoring hole against rotation and said first surfaces frictionally prevent said sleeve from rotating, said transverse wall portion being interposed between said trailing end portion and said annular shoulder of said expander screw so that said second surface thereof abuts said annular shoulder.

2. An anchor as defined in claim 1, wherein said nut means comprises a cap nut having an open end into which said end portion is threaded, and a closed end spanned by a transverse wall portion against which an end fact of said end portion is adapted to abut.

3. An anchor as defined in claim 1, wherein said end portion is provided with screw threads over a section of a first axial length; and wherein said nut comprises a center opening which is tapped over a section of a second axial length; and wherein one of said lengths is shorter than the other.

4. An anchor as defined in claim 1 wherein, said sleeve is wire block spring.

5. An anchor as defined in claim 4, wherein said expander member is provided with a radially extending abutment portion having an outer diameter at least equal to the outer diameter of said sleeve and adapted to engage a terminal convolution of said block spring at said leading end.

6. An anchor as defined in claim 1; wherein said cap is of synthetic plastic material.

* * * * *